Figure 2:
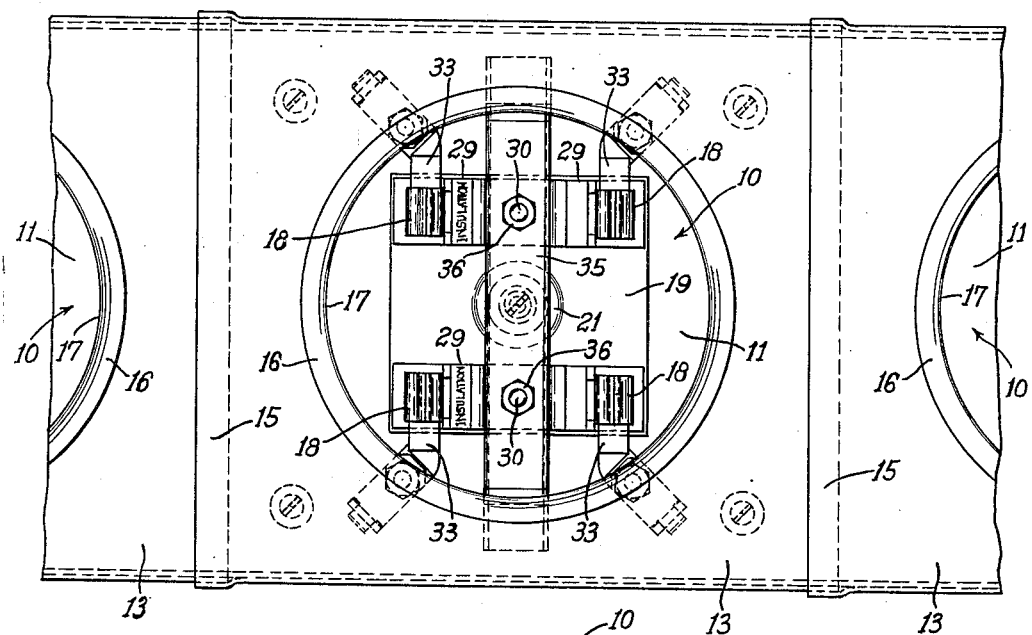

May 27, 1952 W. L. ESPENSCHIED 2,598,521
DETACHABLE AND ADJUSTABLE SUPPORT FOR MOUNTING
CONTACT BOXES IN METER TROUGHS
Filed May 3, 1950 2 SHEETS—SHEET 1

INVENTOR.
Wilbur L. Espenschied
BY
Frease and Bisly
ATTORNEYS

May 27, 1952     W. L. ESPENSCHIED     2,598,521
DETACHABLE AND ADJUSTABLE SUPPORT FOR MOUNTING
CONTACT BOXES IN METER TROUGHS
Filed May 3, 1950     2 SHEETS—SHEET 2
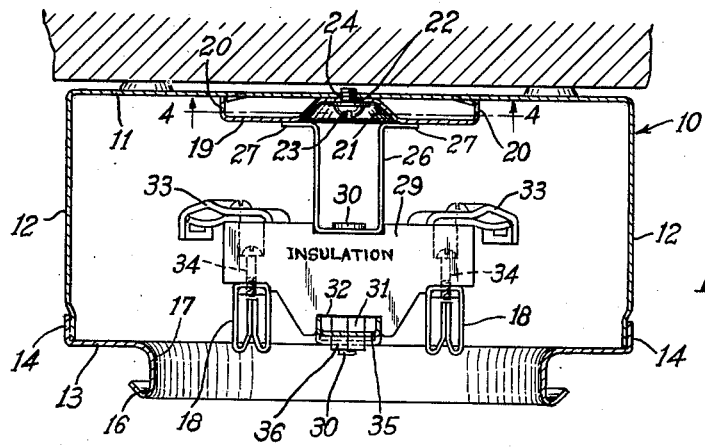
Fig. 3
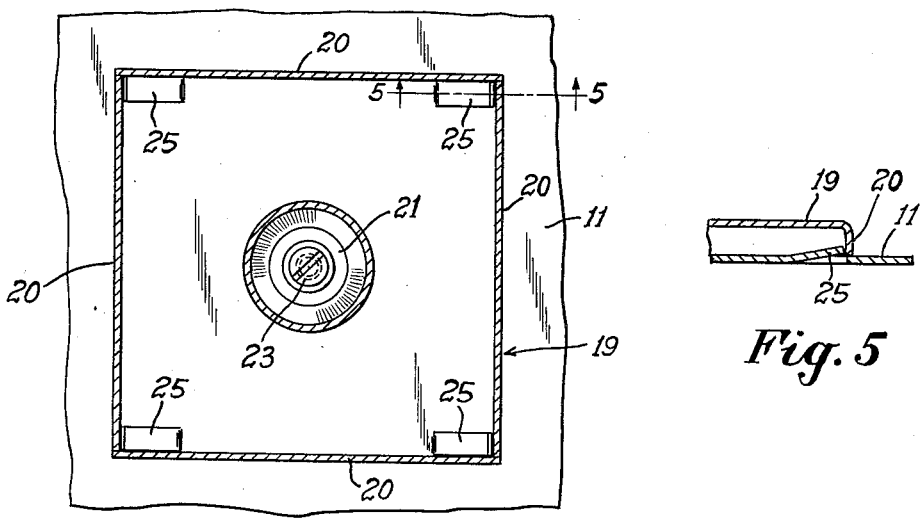
Fig. 4
Fig. 5
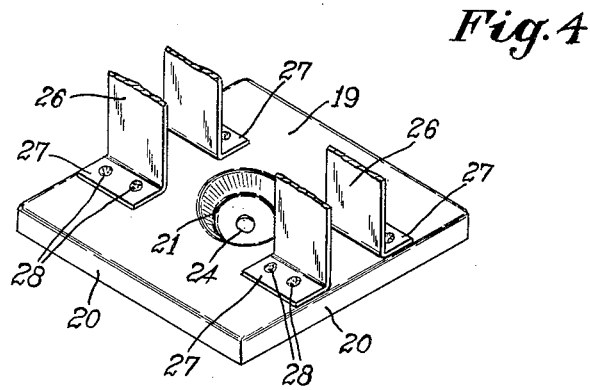
Fig. 6
INVENTOR.
Wilbur L. Espenschied
BY
Freare & Bishop
ATTORNEYS Patented May 27, 1952

2,598,521

UNITED STATES PATENT OFFICE 2,598,521

DETACHABLE AND ADJUSTABLE SUPPORT FOR MOUNTING CONTACT BOXES IN METER TROUGHS

Wilbur L. Espenschied, Canton, Ohio, assignor to The Superior Switchboard & Devices Company, Canton, Ohio, a corporation of Ohio Application May 3, 1950, Serial No. 159,834

6 Claims. (Cl. 175—220)

The invention relates to electrical instrument installations and more particularly to sockets for receiving watthour meters of the detachable type.

Watthour meters for detachable mounting are provided with a plurality of contact blades which project from the rear of the meter casing, and a socket for receiving such a meter is provided with an opening for receiving the contact blades.

The socket contains a plurality of contact jaws for detachably receiving the contact blades of the detachable watthour meter, and when the meter is mounted in position on the socket it closes the opening therein and the contact blades of the meter are received in said contact jaws.

Such a socket may take the form of a trough, open at opposite ends and having a detachable cover section provided with an opening surrounded by a ring flange for receiving a detachable meter. The present invention relates particularly to such socket troughs.

A plurality of these troughs may be connected together, end to end, in either a vertical or horizontal series, for mounting a plurality of detachable meters. In a conventional construction of such troughs these contact jaws, as well as the terminals for the line and load conductors, are carried by insulation permanently secured to the trough.

With such a construction, it is frequently difficult to locate the line and load conductors through the trough and connect them to the terminals. Furthermore, the relative position of the contact jaws must be different for either vertical or horizontal mounting of the troughs, thus requiring that the insulation be permanently secured to the trough in either one or two positions, depending upon whether the trough is to be mounted horizontally or vertically.

It is therefore an object of the invention to provide an improved socket for a detachable meter and the like, which will overcome the above difficulties and disadvantages.

Another object is to provide a detachable and adjustable support for mounting contact jaws in meter troughs.

A further object is to provide such a detachable and adjustable support whereby a meter trough may be quickly and easily adapted for either vertical or horizontal mounting.

It is a still further object of the invention to provide such a support comprising a rectangular base member, means upon the back wall of the trough for engaging the base member and holding it in adjusted position, brackets permanently attached to the base member and insulation blocks permanently attached to the brackets and carrying the contact jaws and the terminals.

Figure 1:
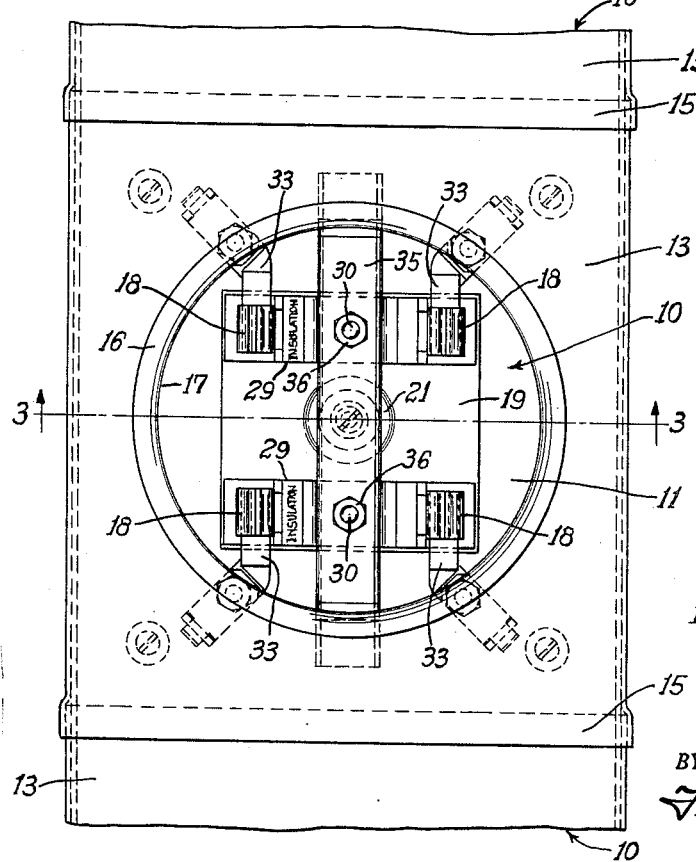

The above objects together with others which will be apparent from the drawings and following description, or which may be later referred to, may be attained by constructing the invention in the manner hereinafter described in detail and illustrated in the accompanying drawings, in which:

Figure 1 is a front elevation of a detachable meter socket trough embodying the invention, with parts of adjacent troughs attached thereto, located in vertical position;

Fig. 2 a similar view showing the troughs mounted in horizontal position;

Fig. 3 a transverse section, taken as on the line 3—3, Fig. 1;

Fig. 4 an enlarged, plan sectional view through the base of the support, taken as on the line 4—4, Fig. 3;

Fig. 5 an enlarged, fragmentary sectional view through a portion of the base of the support and the adjacent portion of the back wall of the trough, showing the means for holding the support in adjusted position, taken as on the line 5—5, Fig. 4; and Fig. 6 a detached, fragmentary, perspective view of the base of the support and the adjacent portions of the brackets which carry the insulation blocks.

Referring now more particularly to the construction illustrated in the drawings, in which similar numerals refer to similar parts throughout, the invention is illustrated as adapted for a trough indicated generally at 10, which may be formed of a single sheet of metal of substantially U-shape section comprising the back wall 11 and side walls 12.

Any desired number of these troughs may be connected together end to end, to accommodate the required number of meters or similar electrical instruments, and the open ends of the endmost troughs in the series may be closed by suitable end plates, as in conventional manner.

A series of these troughs, so connected together, may be mounted vertically, as shown in Fig. 1, or horizontally as shown in Fig. 2. An important feature of the present invention is the provision of means whereby each trough may be quickly and easily adapted for either vertical or horizontal mounting.

The enclosure provided by each trough is completed by a cover 13 of conventional design having the usual flanges 14 embracing the edges of the side walls 12 of the trough. As in usual practice, one end of each cover 13 may be enlarged, as indicated at 15, so as to fit over the end of an adjacent cover.

The usual ring flange 16 is provided upon each cover, defining an opening 17 extending through the cover and adapted to receive a detachable electrical instrument, such as a meter, in usual and well-known manner.

The meter, or other detachable electrical instrument, is provided with the usual contact blades, as in ordinary practice, and for the purpose of receiving the contact blades of the meter, a corresponding number of contact jaws, indicated at 18, are provided in the box.

Since the meter should always be mounted in one position, with the contact blades 17 disposed vertically, it is essential that the contact jaws 18 of the box be located in vertical position, irrespective of whether the trough is located vertically, as in Fig. 1, or horizontally, as shown in Fig. 2.

For this purpose the detachable and adjustable support, to which the invention pertains, is provided. This support includes a base member 19, which is preferably square as shown in the drawings, and may be formed of sheet metal or the like having the backturned angular flanges 20 at its edge portions.

A central depression 21 is formed in the base member 19, of such depth that it will substantially contact the back wall 11 of the trough when the base is positioned thereon, and is provided with the central aperture 22 to receive the attaching screw 23 which is threaded into a tapped opening 24 in the center of the back wall for detachably securing the base 19 to the back wall of the trough.

For the purpose of accurately positioning the support within the trough, tongues 25, or similar projections, may be formed upon the inner surface of the back wall 11 of the trough, in such position as to be snugly fitted within the four corners of the base members 19, each of these tongues or projections contacting two adjacent flanges 20 of the base member at each corner portion thereof.

A pair of inverted, U-shape brackets 26 are permanently attached to the outer surface of the base member 19, preferably near opposite sides thereof as best shown in Fig. 6. The legs of the brackets 26 may terminate in the oppositely disposed flanges 27 which may be spot welded or otherwise permanently attached to the base 19 as indicated at 28.

An insulation block 29 is permanently attached to each bracket 26, as by a bolt 30 having a nut 31 thereon located within the central recess 32 in the outer surface of the insulation block. Each of the insulation blocks 29 carries one of the clamping jaws 18, near each end thereof, and the terminals 33, for connection to the line and load conductors, are permanently attached to these clamping jaws as by the screws 34 which attach the clamping jaws to the insulation blocks. The entire contact box for the detachable meter is thus permanently mounted upon this detachable and adjustable support.

The usual bridge bar 35 is attached in customary manner to the cover 13 and extends diametrically across the opening formed by the ring flange 16. When the cover is positioned upon the trough this bridge bar 35 is received in the recesses 32 in the insulation blocks 29, the ends of the bolts 30 being received through suitable apertures in the bridge bar, as in usual practice, and nuts 36 are placed upon the outer ends of said bolts attaching the cover in position upon the trough.

When it is desired to locate conductors or cables through the trough the nuts 36 are removed and the cover lifted off of the trough. The screw 23 may be removed permitting the entire support, with the contact jaws and terminals, to be removed from the trough so as not to obstruct the placing of the cables through the trough.

The support, with the clamping jaws and terminals thereon is then placed in position against the back wall of the trough, locating the flanges 20 of the base member 19 in contact with the tongues or projections 25, as best shown in Fig. 4, with the support in such position that the clamping jaws 18 will be located vertically. The screw 23 is then inserted and tightened rigidly holding the support in position.

To properly position the clamping jaws 18 in the trough, where the trough is to be mounted vertically, as shown in Fig. 1, the support is so positioned that the insulation blocks 29 are located transversely of the trough.

If it is desired to mount the trough horizontally, as shown in Fig. 2, the support is turned to a position whereby the insulation blocks are located horizontally of the trough in order that the clamping jaws 18 will be located vertically when the trough is mounted.

The line or load cables may be attached to the proper terminals 33 and the cover may then be replaced upon the trough, and attached by means of the nuts 36, after which the detachable meter, or other detachable electrical instrument, may be mounted in position on the socket, the contact blades thereof being inserted into the contact jaws 18 in usual manner.

From the above it will be obvious that the detachable and adjustable support not only facilitates the location of cables through the trough but provides an adjustment for easily and readily adapting the trough for either vertical or horizontal mounting as may be required.

I claim:

1. A detachable and adjustable support for mounting contact jaws in an enclosure adapted to be mounted either vertically or horizontally for detachably receiving a detachable electrical instrument of the type having externally projecting contact blades, the enclosure including a cover having an opening therein designed to be closed by such detachable electrical instrument, said detachable and adjustable support comprising spaced insulating means within the enclosure, contact jaws carried by each of said insulating means for detachably receiving the contact blades of a detachable electrical instrument positioned over said opening, supporting means for supporting said insulating means independently of said cover, said supporting means including a square base member, projections upon the enclosure for positioning the base, and a single screw for adjustably detachably connecting said base member to a portion of the enclosure separate from the cover in either of two positions, whereby the entire supporting means including the square base member and the insulating means with the contact jaws carried thereby may be removed bodily from the enclosure as a unit to facilitate the location of cables through the enclosure and then replaced within the enclosure in either of said two positions, so that the contact jaws may be aligned to receive the contact blades of a detachable electrical instrument when the 2. A detachable and adjustable support for mounting contact jaws in an enclosure adapted to be mounted either vertically or horizontally for detachably receiving a detachable electrical instrument of the type having externally projecting contact blades, the enclosure including a cover having an opening therein designed to be closed by such detachable electrical instrument, said detachable and adjustable support comprising spaced insulating means within the enclosure, contact jaws carried by each of said insulating means for detachably receiving the contact blades of a detachable electrical instrument positioned over said opening, supporting means for supporting said insulating means independently of said cover, said supporting means including a square base member having flanges at its edges, projections upon the enclosure for contact with the flanges upon the base member for positioning it in either of two positions, and means for adjustably detachably connecting the base member to a portion of the enclosure separate from the cover in either of said two positions, whereby the entire supporting means including the square base member and the insulating means with the contact jaws carried thereby may be removed bodily from the enclosure as a unit to facilitate the location of cables through the enclosure and then replaced within the enclosure in either of said two positions, so that the contact jaws may be aligned to receive the contact blades of a detachable electrical instrument when the enclosure is mounted either vertically or horizontally.

3. A detachable and adjustable support for mounting contact jaws in an enclosure adapted to be mounted either vertically or horizontally for detachably receiving a detachable electrical instrument of the type having externally projecting contact blades, the enclosure including a cover having an opening therein designed to be closed by such detachable electrical instrument, said detachable and adjustable support comprising spaced insulating means within the enclosure, contact jaws carried by each of said insulating means for detachably receiving the contact blades of a detachable electrical instrument positioned over said opening, supporting means for supporting said insulating means independently of said cover, said supporting means including a square base member, projections upon the enclosure for contact with the base member for positioning it in either of two positions, bracket means fixed to the base member and carrying the insulation means, and means for adjustably detachably connecting the base member to a portion of the enclosure separate from the cover in either of said two positions, whereby the entire supporting means including the square base member, the bracket means and the insulating means with the contact jaws carried thereby, may be removed bodily from the enclosure as a unit to facilitate the location of cables through the enclosure and then replaced within the enclosure in either of said two positions, so that the contact jaws may be aligned to receive the contact blades of a detachable electrical instrument when the enclosure is mounted either vertically or horizontally.

4. A detachable and adjustable support for mounting contact jaws in an enclosure adapted to be mounted either vertically or horizontally for detachably receiving a detachable electrical instrument of the type having externally projecting contact blades, the enclosure including a cover having an opening therein designed to be closed by such detachable electrical instrument, said detachable and adjustable support comprising spaced insulating means within the enclosure, contact jaws carried by each of said insulating means for detachably receiving the contact blades of a detachable electrical instrument positioned over said opening, supporting means for supporting said insulating means independently of said cover, said supporting means including a square base member having flanges at its edges, projections upon the enclosure for contact with the flanges upon the base member for positioning it in either of two positions, bracket means fixed to the base member and carrying the insulation means, and means for adjustably detachably connecting the base member to a portion of the enclosure separate from the cover in either of said two positions, whereby the entire supporting means including the square base member, the bracket means and the insulating means with the contact jaws carried thereby, may be removed bodily from the enclosure as a unit to facilitate the location of cables through the enclosure and then replaced within the enclosure in either of said two positions, so that the contact jaws may be aligned to receive the contact blades of a detachable electrical instrument when the enclosure is mounted either vertically or horizontally.

5. A detachable and adjustable support for mounting contact jaws in an enclosure adapted to be mounted either vertically or horizontally for detachably receiving a detachable electrical instrument of the type having externally projecting contact blades, the enclosure including a cover having an opening therein designed to be closed by such detachable electrical instrument, said detachable and adjustable support comprising spaced insulating means within the enclosure, contact jaws carried by each of said insulating means for detachably receiving the contact blades of a detachable electrical instrument positioned over said opening, supporting means for supporting said insulating means independently of said cover, said supporting means including a square base member, projections upon the enclosure for contact with the base member for positioning it in either of two positions, and a central screw for adjustably detachably connecting the base member to a portion of the enclosure separate from the cover in either of said two positions, whereby the entire supporting means including the square base member and the insulating means with the contact jaws carried thereby may be removed bodily from the enclosure as a unit to facilitate the location of cables through the enclosure and then replaced within the enclosure in either of said two positions, so that the contact jaws may be aligned to receive the contact blades of a detachable electrical instrument when the enclosure is mounted either vertically or horizontally.

6. A detachable and adjustable support for mounting contact jaws in an enclosure adapted to be mounted either vertically or horizontally for detachably receiving a detachable electrical instrument of the type having externally projecting contact blades, the enclosure including a cover having an opening therein designed to be closed by such detachable electrical instrument, said detachable and adjustable support comprising a square metal base member having rearwardly disposed angular flanges at its edges, brackets fixed to the base member and insulation blocks carried by each of said brackets, contact jaws carried by each insulation block, projections upon the back wall of the enclosure for contact with the inner surface of said angular flanges upon the base member for positioning the base member in either of two positions, and a single screw for adjustably, detachably connecting said base member to the back wall of the enclosure, whereby the entire supporting means including the square base member, the bracket means and the insulating means with the contact jaws carried thereby may be removed bodily from the enclosure as a unit to facilitate the location of cables through the enclosure and then replaced within the enclosure in either of said two positions, so that the contact jaws may be aligned to receive the contact blades of a detachable electrical instrument when the enclosure is mounted either vertically or horizontally.

WILBUR L. ESPENSCHIED.

REFERENCES CITED

The following references are of record in the file of this patent:

UNITED STATES PATENTS

| Number | Name | Date |
| --- | --- | --- |
| 2,066,024 | Winter | Dec. 29, 1936 |
| 2,142,013 | Willis | Dec. 27, 1938 |
| 2,145,546 | Kingdon | Jan. 31, 1939 |
| 2,270,228 | Palmer | Jan. 20, 1942 |
| 2,538,912 | Road | Jan. 23, 1951 |
| 2,542,609 | Wyglendowski | Feb. 20, 1951 |